June 29, 1943.   R. K. VOORHIES   2,322,755
SAFETY DEVICE FOR OCCUPANTS OF VEHICLES
Filed April 1, 1941   3 Sheets-Sheet 1
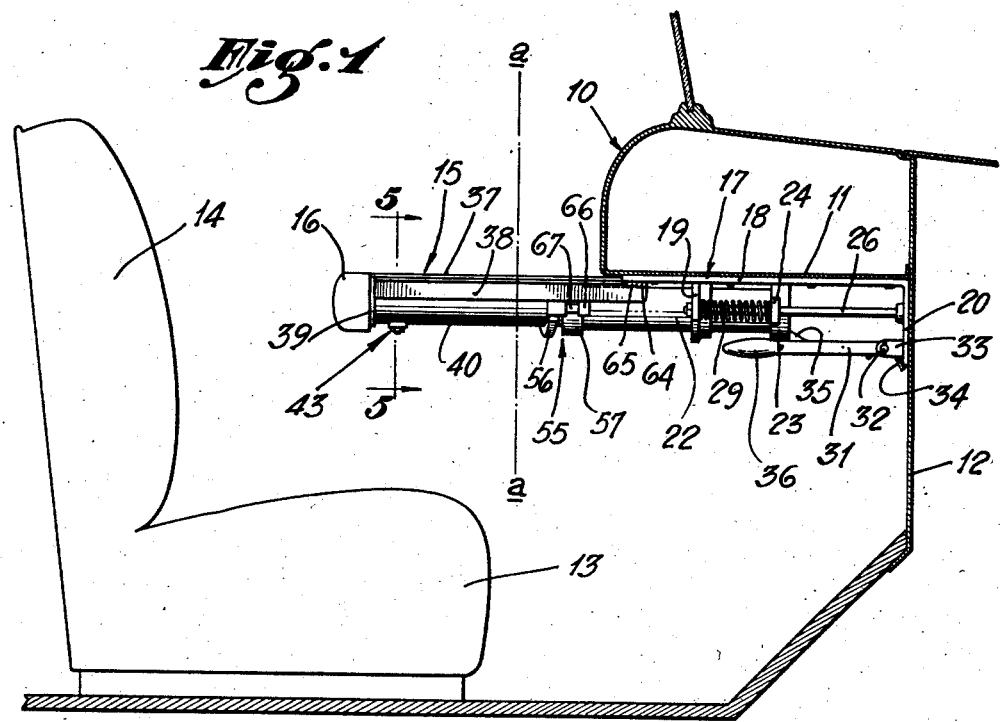
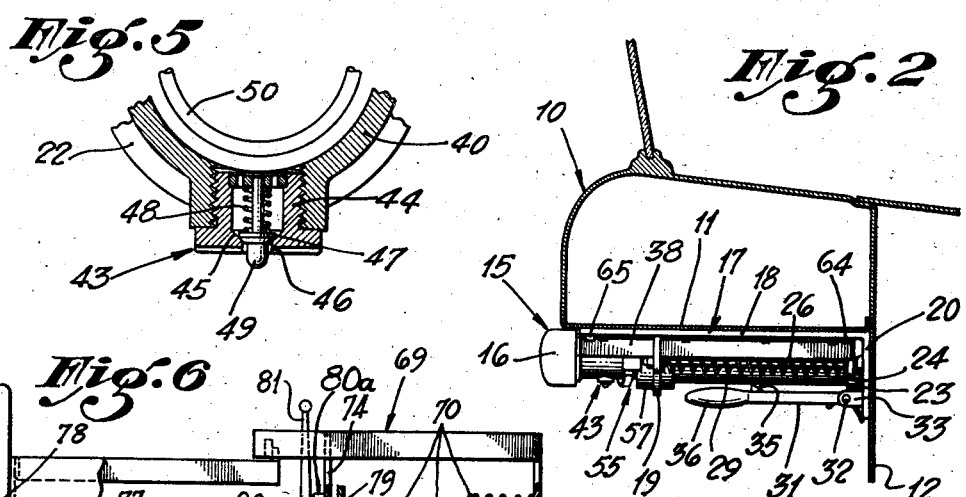
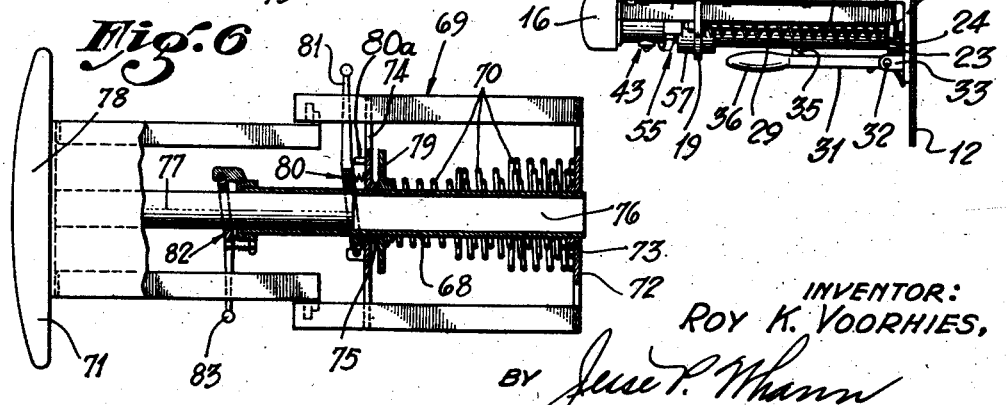
INVENTOR:
ROY K. VOORHIES,
BY *Jesse P. Whann*
ATTORNEY.

June 29, 1943.　　　R. K. VOORHIES　　　2,322,755
SAFETY DEVICE FOR OCCUPANTS OF VEHICLES
Filed April 1, 1941　　　3 Sheets-Sheet 2
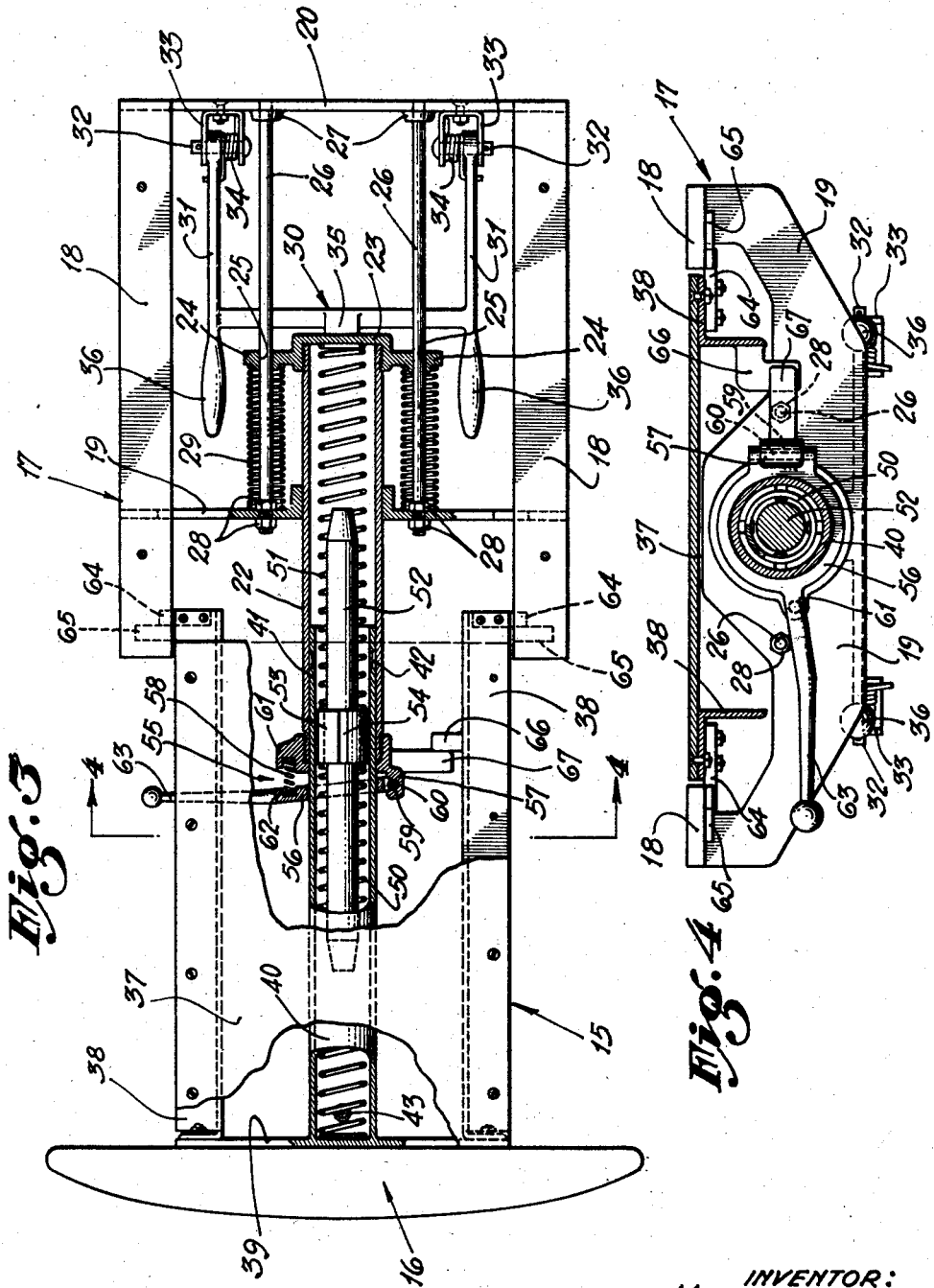
INVENTOR:
Roy K. Voorhies,
BY　*Jesse P. Whann*
ATTORNEY.

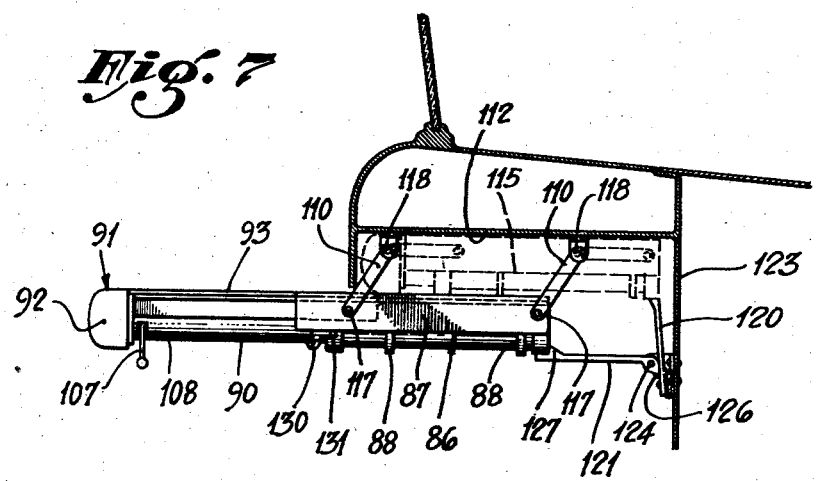
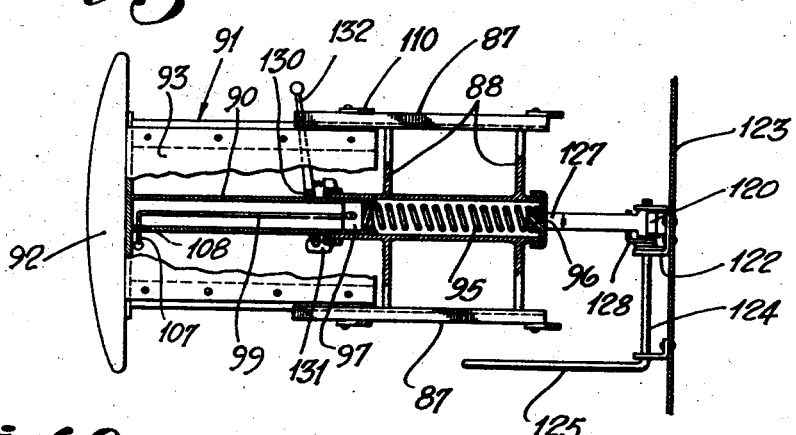
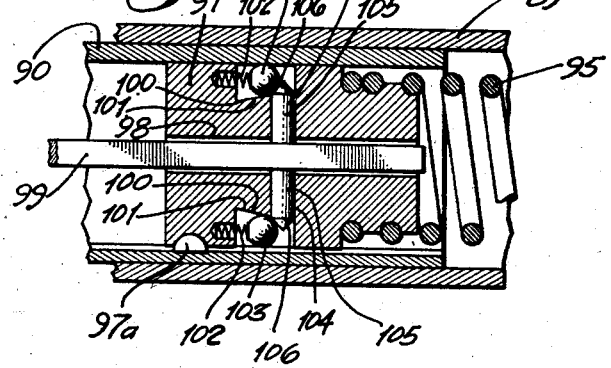

Patented June 29, 1943

2,322,755

UNITED STATES PATENT OFFICE 2,322,755

SAFETY DEVICE FOR OCCUPANTS OF VEHICLES

Roy K. Voorhies, Los Angeles, Calif., assignor to Safride, Ltd., Carson City, Nev., a corporation of Nevada Application April 1, 1941, Serial No. 386,228

11 Claims. (Cl. 280—150)

This application is a continuation-in-part of my pending application, Serial No. 338,524, filed June 3, 1940, for Passenger protective apparatus, which application has been abandoned.

The invention relates to a device having dual utility in vehicles, such as automobiles, which are propelled at relatively high velocities, bringing to the art an organization which will prevent injury of riders due to sudden stopping of vehicles, and which will at one and the same time serve as a table or rest positioned in front of a rider, and having cooperating parts arranged to gradually absorb the momentum of the rider when the vehicle is brought to a sudden stop, either as the result of a severe use of the brakes or the vehicle striking an object.

Although it is an object of my invention to provide a simple and practical safety device for automotive vehicles, adapted to receive force and movement from the body of a passenger due to momentum, when the automobile is brought to a sudden stop, and to bring the passenger to a stop in a manner to avoid injury to him, it is also an important object of the invention to solve an existing problem relating to the use of shelves or tables in vehicles while the same are being propelled forwardly. Tables or shelves have been employed in automobiles, supported in positions over the laps of the riders so as to be used in a normal manner, but it has been recognized that tables so positioned constitute a hazard to the rider in event of an accident. The present invention flows in part from the conception that this hazard may be entirely eliminated and in addition thereto an added safety to the rider may be attained, without any sacrifice of the utility of the table for its normal use, by mounting at the front edge of the table a member having such vertical width as to engage a sufficiently large area of the body of the passenger, and support the table so that it may at all times, without release of latches, etc., be moved forward from its extended position under control of a momentum absorbing means, so that in event of the vehicle being brought to an abrupt stop, a portion of the body of the rider will be brought immediately into engagement with the body engaging member, and then the force of the rider's momentum will be transmitted through the freely movable table structure against the gradually increasing reaction or resistance of the momentum absorbing means, thereby bringing the rider to a stop so that he will not be thrown against the instrument board or against and/or through the wind shield. Accordingly, it is an object of my invention to bring to the art a device such as described in the foregoing.

It is a further object of the invention to provide a safety device for automotive vehicles having a body engaging member adapted to be moved from a retracted position into a body engaging position, and supported in such manner that it may be moved forward from body engaging position, with momentum absorbing means for bringing the body engaging member to a gradual stop when a heavy force is applied thereto by the passenger. A further object of the invention is to provide a device of the character described in the preceding paragraph, wherein the cooperating parts are so associated that adjustment of the body engaging member into operative position will be accompanied by a relative adjustment of the body engaging member and the momentum absorbing means, so that even though the body engaging member may be adjusted into one of a number of operative positions, the resistance to forward movement of the body engaging member exerted by the momentum absorbing means will always start at a low or near zero value and increase gradually to a high value. Accordingly, when a rider is carried forward by momentum, his body is not brought into engagement with a member held relatively rigidly, but engages the body engaging member of my device which exerts very little resistance at the beginning of its forward movement. The result of this arrangement is that the body of the rider, when impelled forward by momentum, does not strike a blow against a relatively unyielding object so as to be bruised thereby. The engagement of the rider's body and the body engaging member of my device is effected in such a way that they are in contact and both in forward movement before any large resistance to the forward movement of the rider's body is exerted by the momentum absorbing means.

It is a further object of the invention to provide a safety device of the character described having a carrier supported in the vehicle so as to be moved from a retracted position into an extended position, a body engaging member adjustably mounted on the carrier so that it may be adjusted into a desired operative relation to the body of a rider, and momentum absorbing means arranged so that it will apply its resistance to at least the carrier part of the body engaging part, enabling movement of the body engaging member by force exerted by the rider under control of the momentum absorbing means.

A further object of the invention is to provide a safety device of the character described arranged to be moved from a retracted position within a recess provided therefor in the vehicle into an extended position, and to have means for adjustment therewith whereby a yieldable body engaging member may be brought into a position cooperative with the body of a rider.

A further object of the invention is to provide a rider safety apparatus of the character described having means for controlling the movement of the body engaging member in such manner that recoil or rebound of the body engaging member will be prevented.

A further object is to provide a device of this character wherein the momentum absorbing means comprises an expansile-contractile member having one relatively movable wall thereof operatively connected with the body engaging member, and being arranged so that fluid resistance within the expansile-contractile member will rise from a near atmospheric pressure gradually to a high pressure when the body engaging member is moved forward from any one of the operative positions into which it may be adjusted, and it is a further object to provide in association with the expansile contractile member means for controlling the flow of fluid so as to attain a novel cooperation of the parts as explained later in detail.

Further objects and advantages of the invention will be brought out in the following part of the specification.

Referring to the drawings which are for illustrative purposes only:

Fig. 1 is a fragmentary sectional view showing the front seat of an automobile with a preferred form of my invention in operative position.

Fig. 2 is a fragmentary sectional view of the cowl portion of Fig. 1, showing the device in retracted position.

Fig. 3 is a partly sectioned plan view of the device in fully extended position.

Fig. 4 is an enlarged section taken as indicated by the line 4—4 of Fig. 3.

Fig. 3 is an enlarged fragmentary section taken on the plane represented by line 5—5 of Fig. 1, and showing the valve means associated with the cylinder and piston mechanism of the device.

Fig. 6 is a plan view, schematic in its general character, showing an alternative form of my invention adapted to be secured in an automobile in the general manner shown in Figs. 1 to 3.

Fig. 7 is a fragmentary sectional view showing a form of my invention adapted to be swung, when in collapsed or retracted position, into a recess provided therefor, under the cowl of the automobile.

Fig. 8 is a plan view of the device shown in Fig. 7.

Fig. 9 is an enlarged fragmentary sectional view, showing the details of the clutch body employed in Fig. 8.

For the purpose of showing one use of my invention, I have in Fig. 1 diagrammatically indicated the instrument panel 10, cowl 11 and fire wall 12 positioned forward of the front seat 13 of an automobile. Projecting from under the cowl toward the back 14 of the seat 13, I have shown the table and body engaging organization 15; this organization 15 being positioned at such a level that it will pass above and be spaced from the knees and upper limbs of the rider or passenger occupying the seat 13. Herein I employ the terms "rider" and "passenger" interchangeably to indicate any person who employs the automobile for the purpose of passing from one place to another. The organization 15 has associated therewith means whereby it may be adjusted from the retracted position shown in Fig. 2 through a plurality of operative positions so that the body engaging member 16 at the end of the organization 15 may be positioned by the rider into a position close to the upright part of his body or in engagement therewith. The means for adjusting the organization 15 and operatively supporting the same includes a supporting frame 17 arranged to be secured to the structure of the vehicle. As shown in Figs. 1, 3 and 4, this support includes a pair of upper bars 18 disposed in a substantially horizontal plane and being held in spaced relation by a front cross bar 19 and a rear plate 20. When the support 17 is secured in the automobile the rear plate 20, which extends in an upright plane, is connected to the fire wall 12. The cross bar 19 is of the general configuration shown in Fig. 4 and has in the central portion thereof below the plane of the side bars 18, a guide opening 21, through which a cylinder 22 passes and in which the cylinder is movable from retracted position as shown in Fig. 2 to an extended position relative to the frame 17 as shown in Figs. 1 and 3, this cylinder 22 accordingly constituting an extensible part of means for guiding and adjusting the organization 15 through its different positions of operation.

The cylinder 22 has a wall 23 closing its rear end, and wings 24 extend laterally from the rear end of the cylinder, with openings 25 therein to receive guide rods 26, disposed in parallel relation to the axis of the cylinder 22. The rear ends of the rods 26 are secured at 27 to the rear plate 20 of the frame 17, and the front ends of the rods 26 are secured to the cross bar 19 by use of opposed nuts 28. Compression springs 29 are placed between the wings 24 and the cross bar 19 to urge the cylinder 22 toward and into retracted position, as shown ni Fig. 2. To hold the movable guide means, or carrier, consisting of the cylinder 22, in extended position, a latch 30 is provided, this latch having side bars 31 swung on pivot means 32, carried by lugs 33 which project forward from the rear plate 20, there being springs 34 to urge the latch means 30 upward whereby its engager 35 will be held in a position to engage the rear end wall 23 of the cylinder 22. Handles 36 are provided whereby the latch 30 may be swung downward to release the cylinder 22 so that the springs will move the same from extended position, as shown in Figs. 1 and 3, to retracted position, as shown in Fig. 2.

The organization 15 includes an upper support, or table, 37, disposed so as to extend in the general direction of horizontal. In the preferred practice of the invention, the upper support 37 will lie substantially in a horizontal plane, but in various applications of the device to automobiles, it is to be expected that in some instances it will be necessary to dispose the same in a near horizontal but sloping plane. The width of the support or table 37 is such that it may pass forward or rightward between the inner edges of the side bars 18 when the support or table 37 is moved from extended to retracted position. The support or table 37 is reinforced by members 38, preferably in the form of structural angles which are placed under the lateral edges thereof. The rear or left ends of the support and the reinforcing members 38 are connected to cross plate 39 from which a hollow piston or plunger 40 extends in axial alignment with the cylinder 22 so that the forward end 41 thereof will pass within the rear end of the cylinder 22. The body engaging member 16 is secured to the cross plate 39. As a sealing means between the plunger 40 and the cylinder 22, a sealing ring 42 is shown on the inner end of the plunger 40.

The cylinder 22 and the plunger 40 constitute a contractile expansile fluid containing a member adapted to exert a gradually increasing resistance against the forward movement of the organization 15, for the purpose of gradually absorbing the momentum of the rider when there is a sudden change in the rate of movement of the vehicle. Although not limited thereto, I prefer to use air as the fluid medium with the expansile contractile means to effect a gradually increasing resistance to or retraction against forward movement of the organization 15 from any of the operative positions into which it may be adjusted. In keeping therewith, I have provided a valve means 43 for the control of the flow of air to and from the interior of the plunger 40 and cylinder 22. This valve means is disposed at the forward end of the plunger 40, and, as shown in Fig. 5, comprises a valve casing 44 and a valve seat 45 around a downwardly faced opening 46. A check valve 47 is urged into engagement with the seat 45 by a spring 48 and from the check valve 47, an engageable member 49 is projected downward through the opening 46, so that by upward pressure of a finger against the member 49, the check valve may be raised from engagement with the seat 45. To supplement the action of air within the contractile expansile means, I provide, in a manner which will be hereinafter described in detail, spring means consisting of compression springs 50 and 51 respectively disposed so as to engage the end plate 39 of the plunger 40 and the end wall 23 of the cylinder 22. To guide and centralize the springs 50 and 51 within the members 40 and 41, I provide a filler 52 which may be made of some light weight material such as wood, in the shape of a long slender cylinder having a collar 53 intermediate the ends thereof, which collar 53 will serve to centralize the filler 52 relative to the axis of the members 22 and 40 and longitudinally with springs 50 and 51. The adjacent ends of the springs 50 and 51 bear against the opposite ends of the shoulder 53, and slots 54 are provided in the collar for movement of the air within the expansile contractile device in axial direction. The filler 52, interchangeable with one of greater or lesser length, provides means for determining the combined internal volume of cylinder and plunger and, therefore, determines the cushioned force against the passenger body exerted to fully extend the plunger 40 into the cylinder 22.

A feature of the invention is that the organization 15 may be moved forward or rightward from the fully extended position in which it is shown in Fig. 1, or any of the operative positions into which it may be selectively adjusted, by the rider, but means are provided for preventing a rebound or recoil of the organization 15 when it has been operated forwardly or rightwardly against the resistance of the fluid in the expansile contractile means and springs 50 and 51. Therefore, the possibility of injury to the rider as the result of rebound or recoil is avoided. To control the rearward movement of the organization 15 relative to the cylinder 22, I provide a friction type of latch 55 comprising a ring 56 swingably associated with a supporting bracket 57 carried on the rear end of the cylinder 22, in such a manner that it is normally urged into diagonal or gripping position, as shown in Fig. 3, by a spring 58. The bracket 57 comprises a ring secured, as by means of threads, on the rear end of the cylinder. This ring has on one side thereof a notch 59 to receive a pivot lug or bar 60 on the corresponding side of the ring 56. On the opposite side of the bracket there is a projection 61 having a pocket to receive one end of the spring 58, and the other end of the spring 58 engages a recess 62 in the corresponding side of the ring 56 to exert a force to swing the ring on the pivot means 60 thereof into diagonal position. A handle 63 projects from the swing side of the ring 56, and provides a means whereby the ring may be swung against the action of the spring 58 to a transverse position wherein it will be disengaged from the surface of the plunger 40, with the result that the plunger 40 may be then moved rearward or leftward relative to the cylinder 22. It will be noted that the latch 55 is of such character that it will not prevent movement of the plunger 40 into the cylinder 22 from an extended position.

Rotation of the organization 15 on the axis of the cylinder 22 is prevented by additional guide and supporting means consisting of lugs 64 which project from the front ends of the reinforcing members 38 under the inner edges of the side bars 18 of the supporting frame 17 so as to make sliding engagement with the side bars 18. Rearward movement of the organization 15 relative to the supporting frame 17 is limited by lugs 65, which project downward from the forward ends of the side bars 18 into the path of movement of the lugs 64. So that rearward movement of the organization 15 from retracted position, as shown in Fig. 2, can never result in withdrawal of the plunger 40 more than a prescribed distance from the cylinder 22, as, for instance, under a circumstance wherein the rider might inadvertently move the organization 15 rearward from retracted position while holding the rebound latch in disengaged position, I provide a lug 66 on one of the members 38 in a position to engage a projection 67 which extends laterally from the bracket 57 at the forward end of the cylinder 22.

When the rider desires to use the device either as a table or rest upon which to place objects, or as a safety device, he will pull rearward on the organization 15 by manual engagement with the ends of the body engaging member 16. This rearward force will be transmitted through the plunger 40 and the latch 55 to the cylinder 22 with the result that the organization and the cylinder 22 will be moved as a unit to such position that the engager 35 of the latch 30 will move upward into a position behind the end wall 23 of the cylinder 22, as shown in Figs. 1 and 3. The rider, by forward or rightward pressure against a handle 63 may then release the latch 55 and move the organization 15 relative to the cylinder 22 and the frame 17 to a selected operative position, with the body engaging member 16 in engagement with or relatively close to the upright portion of his body. During this outward movement of the plunger 40 relative to the cylinder 22, air may pass in through the valve 43. Thereafter, any material force exerted in forward direction against the organization 15, as, for example, by the body of the passenger as a result of a sudden stopping of the vehicle, will result in a movement of the organization 15 in forward direction, during which movement there will be a gradual building up of resistance against the forward movement, at such a rate of increase that the momentum of the passenger will be substantially absorbed before the end 41 of the plunger 40 reaches the end wall 23 of the cylinder 22.

A further feature of the device is that the face of the engager cannot be moved forward beyond the plane a—a, Fig. 1, when it is functioning as a safety device. Accordingly, the forward movement of the passenger is stopped in spaced relation to the instrument panel 10 and windshield of the automobile, likewise, the organization 15 cannot be swung upward from its substantially horizontal plane of movement and therefore the rider cannot be thrown upwardly and forwardly so as to strike the top of the car or the metal frame work at the top of the windshield.

When the organization 15 is in fully extended position as shown in Figs. 1 and 3, the springs 50 and 51 will be nearly relaxed so that their retraction against forward movement of the organization 15 will be so small as to be regarded as substantially zero value. Likewise, the pressure of air within the expansible contractile means represented by the cylinder 22 and the plunger 40 will correspond closely to atmospheric pressure. As the organization is moved forward, so as to move the plunger 40 into the cylinder 22, there will be gradually increased pressure of air within the expansible contractile means and a gradual building up of spring resistance, to maximum values by the time the body engaging member 16 has reached the end of its permissible forward movement indicated by the plane a—a of Fig. 1. Should the organization 15 be adjusted into a position forward of the fully extended position in which it is shown in Fig. 1, the distance which it may travel before reaching the end of its permissible forward movement will be decreased and, since the air pressure within the cylinder and the plunger is at atmospheric at the start of the forward movement of the organization 15, the air pressure within the plunger and cylinder 22 will build up to a lower value. However, the springs 50 and 51 will be partly compressed at the start of the forward movement of the organization 15, and therefore the springs' resistance will build up from this initial spring resistance, resulting from the fact that the springs are under partial compression at the start of the forward movement of the organization 15 due to the fact that the organization 15 was adjusted into an operative position ahead of its fully extended position. In the ordinary use of the device, I have found that the momentum of a rider is fully absorbed before the organization 15 reaches the limit of its forward permissible movement. When the rider desires to move the device into retracted position, he first applies upward pressure against the member 49, Fig. 5, to raise the valve 47 and then forces forwardly against the organization 15 whereupon the plunger 40 may be readily moved into the cylinder 22 against the action of the springs 50 and 51, while air is displaced freely to the exterior through the open valve 47. When the limit of the forward movement of the plunger 40 in the cylinder 22 is reached, the rider, by engagement of the handle 36 may swing the latch 30 downward whereupon the springs 29 will carry the cylinder 22 and the organization 15 into fully retracted position under the cowl 11.

In the form of the invention disclosed in Fig. 3, the body engaging organization 15 is yieldably supported by a carriage which may be moved and locked into an extended position. Between this rigidly held carriage, comprising the cylinder 22 and the body engaging member, momentum absorbing means are effective. In Fig. 6, I show a simple structure wherein a carrier 68 is movably supported by a supporting frame 69 and momentum absorbing means 70 are disposed between the carrier 68 and the frame 69 with a body engaging organization 71 adjustable through consecutive operative positions relative to the carrier 68. The frame 69 has a rear wall 72 with an opening 73 therein, and a front wall 74 with an opening 75 therein. The carrier 68 comprises a tube which is slidable in the openings 73 and 75, the opening 76 of the member 68 receiving a bar 77 which forms part of the body engaging organization and extends forward from the body engaging member 78 of the organization. The momentum absorbing means 70 is shown as coil spring means placed between the rear wall 72 of the frame 69 and a flange or shoulder 79 on the tube 68. The tube 68 may always be moved in forward direction, or rightward, against the resistance of the spring 70 from its normal position shown in Fig. 6. Leftward movement, or recoil, of the tube 68 is controlled by a diagonal ring latch 80 adapted to be swung into releasing position by rearward movement of the handle 81. The compression spring means 70 may consist of more than one spring, placed concentrically as shown, or otherwise, so as to provide progressively increasing pressures during movement of the body engaging member 78 and so approximate the build-up of cushioned resistance attained by fluid compression as described. At the left end of the tubular member 68 there is a clutch or engager 82 for locking the tube 68 and the bar 77 together in such a manner that the bar cannot be moved rightward relative to the tube 68. This clutch or locking means 82 may be of the diagonal friction ring type and may be released by pulling leftward or rearward on an associated handle 83. The body engaging organization 71 may be adjusted relative to the tube 68 and toward the body of the vehicle occupant, through a plurality of operative positions. The body engaging organization may be moved forward from any of these positions of operation due to the fact that the bar 77 and the tube may be moved at any time as a unit in forward direction against the increasing resistance of the momentum absorbing means represented in Fig. 6 as a coil spring.

In the form of the invention shown in Fig. 6, the spring means 70 normally remains in relaxed condition, with the carrier 68 resting in the position in which it is shown in full lines. It is intended that the rebound latch means 80 shall have stop means 80a for limiting its release so that after the carrier has been forced forwardly from its normal position and the spring means 70 has been compressed, the latch means 80 will act as a recoil dampener by exerting a frictional drag on the carrier 68 so that release of the latch means 80 will not result in an unrestrained return of the carrier 68 under force of the spring means 70.

In the forms of my invention shown in Figs. 1 to 6, the cooperating parts are shown as being of essentially sliding character. In Figs. 7 to 9, I show an alternative form of the invention wherein parts of the device are arranged for swinging movement. In keeping with the conception that in the practice of the invention, the principles disclosed in the foregoing may be embodied in a structure having swingably supported parts, and that in many instances it may be desirable to swing the combined table and safety device into retracted position within a recess provided therefor in the automobile. As shown in Figs. 7 and 8, I provide a carrier 86 in the form of a frame having side bars 87 and cross bars 88 supporting a cylinder 89 which is opened at its rear end so as to receive a tube 90 which forms a part of a table and body engaging organization 91 having a laterally disposed body engaging member 92 with a wall or table 93 projecting forward therefrom so as to project into and slide in slots 94 in the inner edges of the side bars 87 of the carrier 86.

Within the forward end of the tube 89 there is a compression spring 95 which represents the momentum absorbing means of this form of the invention. This spring 95 is of such length that it will project into the forward end of the tube 90 when the tube 90 is in fully extended position relative to the tube 89. The forward end of the spring 95 is secured at 96 to the forward end wall of the tube 89, and a clutch body 97 is secured on the rear end of the spring 95 within the tube 90, key means 97a being provided to prevent rotation of the body 97 relative to the tube 90. As best shown in Fig. 9, the clutch body 97 has an axial opening 98 through which a cam rod 99 is slidable, this cam rod 99 being of non-circular cross section, for example, square. In the surface of the clutch body 97 there are a plurality of pockets 100, having bottom walls 101, which diverge rightwardly or rearwardly. These bottom walls 101 serve as inclines along which springs 102 may move clutch bodies 103, shown as steel balls outward into engagement with the inner face of the tube 90. From the rear or rightward ends of the pockets 100 guide openings 104 extend radially into communication with the axial opening 98 of the clutch body 97. Releasing pins 105 are slidable in the guide openings 104, and the inner ends thereof engage the flat surfaces of the bar 99. When the bar 99 is rotated through an angle of 45 degrees, the corner portions of the bar 99 will force the members outward, and sloping faces 106, formed at the outer ends of the members 105 in confronting relation to the balls 103, will force the balls 103 forward or leftward from the positions of engagement with the tube 90 in which they are shown in Fig. 9, so that these balls 103 may travel down the inclined walls 101 and therefore move out of clutching or locking engagement with the tube 90.

As shown in Fig. 8, the bar 99 extends axially within the tube 90 and at its rear end has a handle 107 which projects through an arcuate slot 108 in the wall of the tube 90, making it possible to rotate the bar 99 so as to release the locking means of the clutch body 97 whenever desired. The carrier 86 is swingable on links 110, so that when the body engaging organization 91 is in retracted relation to the carrier 86, the entire assembly may be swung forward and upward on the links 110 into a recess 112 formed under the cowl 113 ahead of the instrument panel 114 of an automobile, as shown by dotted lines 115 in Fig. 7. The lower ends of the links 110 are connected by pivots 117 to the side bars 87 and the carrier 86, and the upper ends of the links 110 are connected by means of pins 118 to the structure of the automobile. As shown in Fig. 7, a spring latch 120 may be positioned so as to engage the rear end of the device when it is retracted within the recess 112, as shown by dotted lines 115. This spring latch 120 extends across the rear end of a latch bar 121 pivotally supported by brackets 122 on the fire wall 123 at the forward end of the space under the cowl. The latch bar 121 is connected by a shaft element 124 with a handle 125 as shown in Fig. 8. When the handle 125 is swung downward, the latch bar 121 will be rotated in anti-clockwise direction, and a toe 126 disposed at the rearward end thereof will swing the spring latch 120 in forward direction and out of engagement with the device retracted within the recess 112. When the carrier 86 is swung out of the recess 112 into extended position, as shown in Fig. 7, a latch dog 127 on the forward end of the latch bar 121, will be moved upwardly by the associated spring 128 into engagement with the rear end wall of the tube 89, thereby holding the carrier 86 in extended position, this carrier 86 then holding the body engaging assembly 91 so that it may be adjusted through various operative positions. When the organization 91 is moved rearward for the purpose of adjusting the same into a desired relation to the rider, the tube 90 may move leftward relative to the spring 95 and the clutch body 97, since the springs 102 permit the balls 103 to yield leftwardly, but the clutch body 97 will then be locked by the balls 103 to the tube 90 so that if the body engaging organization 91 is moved forward, the clutch body 97 must of necessity move therewith against the increasing force of the spring 95, the result being that when the body engaging organization is adjusted into an operative position relative to the rider, forward movement of the rider as a result of a sudden stopping of the vehicle will move the organization 91 against the resistance of the spring 95 so that the momentum of the rider will be absorbed and the rider will be brought to a stop without serious injury in case of a relatively bad smash-up and with no injury whatsoever as a result of a minor mishap. Rebound of the body engaging organization 91 as a result of recoil of the spring 95 is provided by a control means shown as a diagonal ring friction clutch 130, swingably mounted on a bracket 131 carried at the forward end of the tube 89 and having an associated handle 132 for its release, in the general manner described relative to the latch 55, described in detail in relation to Fig. 3. When it is desired to move the organization 91 rightward into retracted position relative to the carrier 87, the handle 107 may be rotated downward from the position in which it is shown in Fig. 8, thereby rotating the bar 99 so as to force the release keys 105 outward, thereby shifting the clutch balls 103 leftward along the inclined walls 101 so that the tube 90 may then slide rightward relative to the clutch body 97 and the springs 95 from the position in which it is shown in full lines in Figs. 8 and 9.

It will be noted that in Figs. 7 to 9, I have shown a device having a body engaging member which may be adjusted from a retracted position through a plurality of operative positions toward the body of the rider, with an associated momentum absorbing means in such relation to the body engaging member that it will always operate, except when the clutch means 103 are released, to apply to the body engaging member a reaction which will vary from a low value at the start of the forward movement of the body engaging member, and will gradually increase in value as the rightward movement of the body engaging member is continued. This same principle of operation is embodied in the momentum absorbing means shown in the forms of the invention disclosed in Figs. 1 to 5 and 6.

I claim as my invention:

1. In a vehicle having a recess therein: link means operatively placed relative to said recess; a rider safety device swingable on said link means from a position retracted within said recess to an extended position, said safety device comprising a supporting means having pivotal connection with said link means, a body engaging member adjustable into extended position relative to said supporting means, so as to be movable from said extended position toward said supporting means; and means for cushioning the movement of said body engaging member toward said supporting means.

2. In a vehicle having a recess therein: link means operatively placed relative to said recess; a rider safety device swingable on said link means from a position retracted within said recess to an extended position, said safety device comprising a supporting means having pivotal connection with said link means, a body engaging member adjustable into extended position relative to said supporting means, so as to be movable from said extended position toward said supporting means; means for cushioning the movement of said body engaging member toward said supporting means; latch means to hold said safety device in said recess; and latch means to secure said supporting means in said extended position.

3. In a safety device for vehicles of the character described, adapted to be mounted in the vehicle in advance of the body of a person, the combination of: an organization including a supporting member and a body engaging member carried at the free end thereof, means for supporting said organization in the vehicle in front of a person so that said organization is free to be moved forwardly by the momentum force of the person from a position relatively close to the body of the person, said organization embodying means for absorbing the forward momentum force of the person, and means for preventing rebound of said organization toward the body of the person.

4. In a safety device for vehicles adapted to be mounted in the vehicle and having a body engaging means operative through a range of positions in advance of the body of a passenger, the combination of: supporting means securable within the vehicle, a body engaging member movably carried by said supporting means so as to be adjusted through a series of operative positions in advance of the body of the passenger, said body engaging member being movable forwardly by forward momentum of the passenger from any of said operative positions, and means for cushioning the forward movement of said body engaging member when it is moved forwardly by the body of the passenger upon a sudden change in the rate of movement of the vehicle.

5. In a safety device for vehicles adapted to be mounted in the vehicle and having a body engaging means operative through a range of positions in advance of the body of a passenger, the combination of: supporting means securable within the vehicle, a body engaging member movably carried by said supporting means so as to be adjusted through a series of operative positions in advance of the body of the passenger, said body engaging member being movable forwardly by forward momentum of the passenger from any of said operative positions, means for cushioning the forward movement of said body engaging member when it is moved forwardly by the body of the passenger upon a sudden change in the rate of movement of the vehicle, and means for controlling the movement of said body engaging member toward said passenger.

6. In a safety device for vehicles adapted to be mounted in the vehicle and having a body engaging means operative through a range of positions in advance of the body of a passenger, the combination of: supporting means securable within the vehicle, a body engaging member movably carried by said supporting means so as to be adjusted through a series of operative positions in advance of the body of the passenger, said body engaging member being movable forwardly by forward momentum of the passenger from any of said operative positions, and means for controlling forward movement of said body engaging member so as to absorb the momentum of the body of the passenger upon sudden decrease in the rate of movement of the vehicle.

7. In a safety device for vehicles adapted to be mounted in the vehicle and having a body engaging means operative through a range of positions in advance of the body of a passenger, the combination of: supporting means securable within the vehicle ahead of a passenger seat in said vehicle, a body engaging member movably carried by said supporting means so as to be adjusted rearwardly from an extreme position ahead of the body of the passenger through a series of operative positions in advance of the body of the passenger over the lap of the passenger and substantially into contact with the torso of the passenger, said supporting means holding said body engaging member in each of its positions of adjustment so that it will yield forwardly from any of said operative positions to absorb momentum of the body of the passenger and also limit upward movement of the passenger in event of a sudden decrease in the rate of forward movement of the vehicle.

8. In a safety device for vehicles adapted to be mounted in the vehicle and positioned forwardly of a passenger, the combination of: a primary supporting member adapted to be affixed to the vehicle, a secondary member carried by and extensible from said primary member, a body engaging member adjustably carried at the rear of said secondary member, and means yieldably operative between two of said members for absorbing the momentum force applied to said body engaging member by a passenger upon a sudden change in rate of movement of the vehicle.

9. In a safety device of the character described for use in vehicles and adapted to be positioned in a vehicle forwardly of a passenger, the combination of: a primary supporting structure, a secondary structure extensible from said primary supporting structure, a cylinder piston device located below the upper plane of said primary and secondary structures, said cylinder piston device embracing a cylinder part and a piston part, one of the parts being connected to the primary supporting structure, and the other part being connected to the said extensible structure, a body engaging member carried at the rear edge of said extensible structure, means for admitting fluid to said cylinder piston device whereby it will be charged with fluid and the forward momentum of a passenger occasioned by the sudden decrease in rate of speed of the vehicle will be cushioned by said device, and means manually operative to release said fluid from said cylinder piston device.

10. In a safety device for use in vehicles adapted to be mounted in the vehicle forwardly of a passenger, the combination of: a primary support for attachment to the vehicle, provided with guide means; an extensible member movably carried by said guide means; a body engaging member carried at the rear edge of said extensible member; means for absorbing forward momentum of the passenger upon sudden change in rate of speed of the vehicle operative between said primary supporting means and said extensible means; and means for adjusting said extensible member to any operative position in advance of the body of a passenger, said last named means being also operative to prevent rebound of said body engaging member.

11. A safety device for use in vehicles adapted to be mounted in a vehicle forwardly of a passenger, the combination of: a primary structure for direct attachment to the vehicle forwardly of a passenger, an extensible structure carried by said primary supporting structure, a cylinder piston device embracing a cylinder part carried by one of said structures and a piston part carried by the other of said structures, a body engaging member at the rear edge of said extensible structure, a flat member having a free edge contiguous to said body engaging member carried by said extensible structure, and having guiding engagement with said supporting structure, means for controlling flow of fluid to and from said cylinder piston device so that the reaction of fluid pressure therein will absorb forward momentum of the passenger upon a sudden decrease in rate of speed of the vehicle.

ROY K. VOORHIES.